(12) United States Patent
Dani

(10) Patent No.: US 11,087,076 B2
(45) Date of Patent: Aug. 10, 2021

(54) VIDEO GRAPH AND AUGMENTED BROWSER

(71) Applicant: Nishant Dani, Redmond, WA (US)

(72) Inventor: Nishant Dani, Redmond, WA (US)

( * ) Notice: Subject to any disclaimer, the term of this patent is extended or adjusted under 35 U.S.C. 154(b) by 0 days.

(21) Appl. No.: 16/816,498

(22) Filed: Mar. 12, 2020

(65) Prior Publication Data

US 2020/0218853 A1 Jul. 9, 2020

Related U.S. Application Data

(63) Continuation of application No. 15/862,271, filed on Jan. 4, 2018, now abandoned.

(60) Provisional application No. 62/442,638, filed on Jan. 5, 2017.

(51) Int. Cl.
| | |
|---|---|
| *G06F 40/166* | (2020.01) |
| *G06T 17/20* | (2006.01) |
| *G06T 3/00* | (2006.01) |
| *G06Q 30/02* | (2012.01) |
| *G06T 19/20* | (2011.01) |

(52) U.S. Cl.
CPC ....... *G06F 40/166* (2020.01); *G06Q 30/0275* (2013.01); *G06Q 30/0277* (2013.01); *G06T 3/0037* (2013.01); *G06T 17/20* (2013.01); *G06T 19/20* (2013.01); *G06T 2219/2008* (2013.01)

(58) Field of Classification Search
CPC ...................................................... G06F 17/24
USPC ........................................................ 715/204
See application file for complete search history.

(56) References Cited

U.S. PATENT DOCUMENTS

| | | | | |
|---|---|---|---|---|
| 7,970,193 B2* | 6/2011 | Rouet | ................... | G06T 7/0012 382/131 |
| 9,734,634 B1* | 8/2017 | Mott | ...................... | G06F 3/0304 |
| 10,102,680 B2* | 10/2018 | Jurgenson | ............... | G06F 3/012 |
| 2008/0065737 A1* | 3/2008 | Burke | ................... | G06F 16/437 709/217 |
| 2008/0249855 A1* | 10/2008 | Collins | .................. | G06Q 30/00 705/14.54 |
| 2011/0137724 A1* | 6/2011 | Ramchandran | ........ | G06Q 30/02 705/14.49 |
| 2012/0259712 A1* | 10/2012 | Hyndman | ............. | G06T 19/006 705/14.73 |
| 2013/0201185 A1* | 8/2013 | Kochi | ..................... | A63F 13/52 345/419 |

(Continued)

OTHER PUBLICATIONS

Final Office Action received for U.S. Appl. No. 15/862,271 dated Sep. 18, 2019, 28 pages.

(Continued)

*Primary Examiner* — Reza Nabi
(74) *Attorney, Agent, or Firm* — Amin, Turocy & Watson, LLP

(57) ABSTRACT

The described technology is directed towards a computer program such as a browser that outputs augmented objects. The program is coupled to obtain object-related recognizer data of an object, communicate the object-related recognizer data to a registration service, receive augmentation data from the recognizer service and output at least part of the augmentation data in association with the object as an augmented object. Aspects include obtaining object-related recognizer data of an object, communicating the object-related recognizer data to a registration service, receiving augmentation data from the recognizer service, and outputting at least part of the augmentation data in association with the object as an augmented object.

20 Claims, 15 Drawing Sheets

(56) References Cited

U.S. PATENT DOCUMENTS

| | | | | |
|---|---|---|---|---|
| 2013/0303285 A1* | 11/2013 | Kochi | ............. | A63F 13/56 463/32 |
| 2013/0328867 A1* | 12/2013 | Jung | ............. | G01C 21/3647 345/419 |
| 2014/0253589 A1* | 9/2014 | Tout | ............. | G06K 19/06046 345/633 |
| 2015/0002506 A1* | 1/2015 | Saarimaki | ............. | G06T 11/60 345/419 |
| 2015/0204687 A1* | 7/2015 | Yoon | ............. | G01C 21/3647 701/436 |
| 2015/0206353 A1* | 7/2015 | Grasso | ............. | G06T 19/006 345/633 |
| 2015/0229916 A1* | 8/2015 | Berenok | ............. | G06T 5/006 348/51 |
| 2016/0055681 A1* | 2/2016 | Koyrakh | ............. | G06T 11/00 345/427 |
| 2016/0067593 A1* | 3/2016 | Yim | ............. | A63F 13/23 463/31 |
| 2016/0300030 A1* | 10/2016 | Vann, Jr. | ............. | G06F 3/038 |
| 2016/0379410 A1* | 12/2016 | Sharma | ............. | H04N 21/4316 345/633 |
| 2017/0124713 A1* | 5/2017 | Jurgenson | ............. | G06T 7/73 |
| 2017/0251538 A1* | 8/2017 | Green | ............. | G06T 7/74 |
| 2017/0315790 A1* | 11/2017 | Samatov | ............. | G06F 8/61 |
| 2018/0061130 A1* | 3/2018 | Wojdala | ............. | H04L 65/4076 |
| 2018/0189252 A1* | 7/2018 | Dani | ............. | G06T 19/20 |
| 2018/0349703 A1* | 12/2018 | Rathod | ............. | G06Q 20/047 |
| 2019/0019336 A1* | 1/2019 | Coggins | ............. | A61B 5/743 |

OTHER PUBLICATIONS

Non-Final Office Action received for U.S. Appl. No. 15/862,271 dated Jan. 10, 2019, 33 pages.

* cited by examiner

VIDEO GRAPH AND AUGMENTED BROWSER

CROSS-REFERENCE TO RELATED APPLICATION

The present application is a continuation of co-pending U.S. patent application Ser. No. 15/862,271, filed Jan. 4, 2018, which claims priority to U.S. provisional patent application Ser. No. 62/442,638, filed Jan. 5, 2017, the entirety of which is hereby incorporated by reference.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products facilitating securing program code and data are described.

According to an embodiment, a system can comprise a computer program such as a browser that outputs augmented objects. The computer program can be coupled to obtain object-related recognizer data of an object, communicate the object-related recognizer data to a registration service, and receive augmentation data from the recognizer service. The computer program can output at least part of the augmentation data in association with the object as an augmented object.

According to another embodiment, a computer-implemented method can comprise obtaining object-related recognizer data of an object and communicating the object-related recognizer data to a registration service. The method can further comprise receiving augmentation data from the recognizer service, and outputting at least part of the augmentation data in association with the object as an augmented object.

Other aspects and advantages may become apparent from the following detailed description when taken in conjunction with the drawings.

DESCRIPTION OF THE DRAWINGS

FIG. 8A shows the information maintained on the structure, while FIG. 8B shows how a user may view a representation on a 2D screen, in accordance with one or more embodiments described herein.

DETAILED DESCRIPTION

Figure 1:
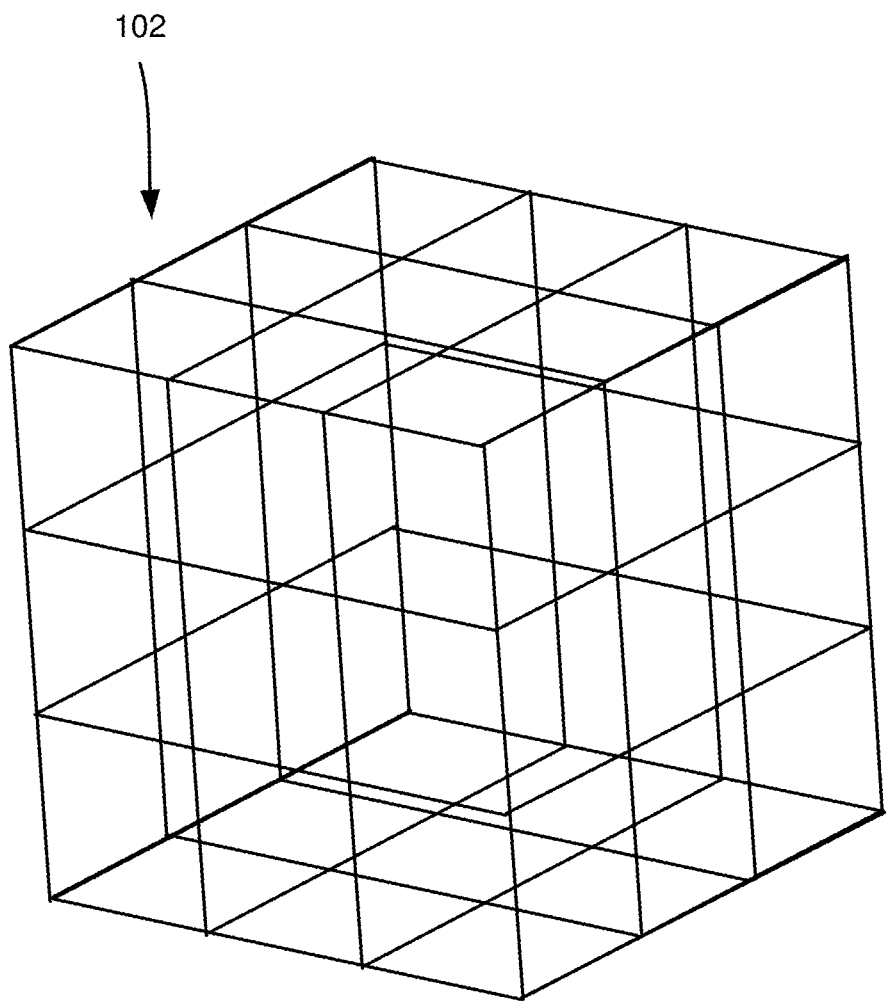
FIG. 1 is a representation of a grid structure comprising an arrangement of pods, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

Aspects of the technology described herein are directed towards a three-dimensional (3D) video fabric which, for example, can overlay any knowledge base, including the entire web. As will be understood, the video graph is able to stretch across the virtually countless million mobile devices, tablets, other client devices and servers. The underlying operating system on each such device need not be a consideration, and indeed, the video graph provides a different operating system for immersive client experiences above any such underlying operating system. This video graph operating system no longer needs to be isolated to a single device, has virtually limitless reach, and extends seamlessly and transparently over any number of devices.

Described herein is a technology for how knowledge and productivity experiences are produced and consumed via a deep video experience in which a user may remain immersed for long periods of time, with little need to return to traditional two-dimensional (2D) channels, such as conventional internet video. Instead, described herein is a channel experience where the user may remain immersed, navigate throughout and need not leave, with the traditional web as currently known relegated to a generally less desirable, legacy experience. Indeed, as applications get ported to the fabric described herein there is less need for users to return to the old web.

To this end, aspects provided and described herein include a topology, connectivity and fabric, which, for example, allow the video graph to be constructed in smaller parts, e.g., patch by patch, as users lay out the structure. Among other aspects, described herein with respect to the topology is a new language that deals with verbs and paradigms that are to become common in this experience. For example, the video graph has video "pods," "warps" (adapted from the term "warp") and the docking of pods, along with "splats" and "voxels" (each of which is able to be arranged within one or more grids). These concepts create new and comprehensive topological structures, along with constructional elements having semantics on how to join and how to transfer from one part of the immersive world to another. The graph connects them, and there is an underlying transactional video system that allows the construction to come together.

With respect to the video graph topology and topological constructs, pods can be considered a topological element that service as building blocks of the video graph. Contributors make pods available, somewhat analogous to the way websites are provided today. The topology supports notional joins and connections, and with these pods as the building blocks, entire new systems and applications are able to be constructed. Pods understand how to stack up against other pods. Users, including pod contributors and those who otherwise access pod content, access are free to operate in isolation or in conjunction with other constructions.

Figure 2A:
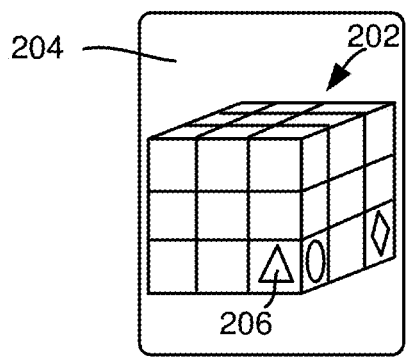
FIGS. 2A-2E illustrate pods in cube structures, including how images can be displayed on a pod and change with pod rotation, in accordance with one or more embodiments described herein.

Pods in one or more implementations comprise a 1×1×1 unit, which may be arranged in a grid structure 102 (FIG. 1), such as shown in FIG. 2A in which each pod is a cube structure, with the cubes (pods) arranged (docked) into a 3×3×3 grid structure 202. The grid structure 202 may, for example, be displayed on a display screen 204. Any 3D structure may be used as a pod, however for purposes of avoiding computational complexity, in one or more implementations, a pod is a regular polyhedron. In addition to a cube, regular polyhedral include, but are not limited to a tetrahedron, octahedron, dodecahedron, icosahedron and so on.

The most common pods are regular polyhedrons, however similar principles apply to non-regular polyhedrons. There is symmetry to regular polyhedrons that make them a more-favored structure in one or more implementations. Notwithstanding, there may be applications for which other, closed non-regular structures may work as well, and possibly be more favorable. Thus, in general, a straightforward definition of a pod is a closed 3D surface with distinct planar faces separated by edges. This definition encompasses polyhedrons such as simple tetrahedrons and cubes, ranging from a many sided polyhedron to non-regular closed surfaces, and so on.

To support additional structure for the video graph applications, described herein are grids. A grid (e.g., the grid 102 of FIG. 1) is a larger, more complex structure that has a similar shape as a pod, but its faces are further subdivided into smaller segments called splats. For instance on a 9×9×9 cube, each face has 9×9 sections and a 3×3 section may be isolated to be a splat. This splat can be treated as an atomic unit that can be dragged to a different position on the grid, either within the same face, or across the edge of the structure to a different face. When splats move they exchange with other splats their position. Further, the system can also dock a cube pod onto a splat where the six faces of the cube are arranged in some manner on a 3×3 splat. The cube unwraps itself while splatting and settles on the splat. This unwrapping can be reversed as well, and a cube may be extracted from a splat as well.

Thus, splats are areas on a grid where a smaller pod may be unwrapped. When a pod comes in, it carries media on one or more or all of its faces. So one face could have an image, another face an animation, still another some media recording, and so on. When the pod is unwound, that information is now available on the splat.

Thus, a pod may relate to one or more splats, where a "splat" is a 2D data container in which the data can be considered as maintained as part (or all) of a 2D surface of a 3D structure. A splat, for example, may be an unfolded cube that takes up six of the nine squares on any face of the 3×3×3 grid structure 202. A splat may also comprise data on one of the nine squares of a grid structure face. In one or more implementations, a splat grid is a 9×9×9 grid data structure, but this is only one possible, non-limiting alternative. A splat grid holds its information on the faces of the polyhedron.

For example, the triangle image 206 in FIG. 2A may be considered a splat. Example data maintained via a splat is an image; a real-world physical analogy may be that of adhering a two dimensional photograph onto the face of a cube. However, other data of a splat may include graphics, video, audio, text, animated graphics and so forth. Note that a splat may also be used as a verb, e.g., to "splat" data (e.g., an image) onto a pod, "splatting" data onto a pod, a pod with data "splatted" thereon, and so forth.

Figure 2B:
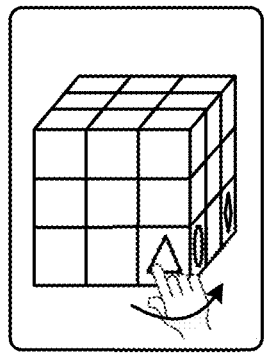
Figure 2C:
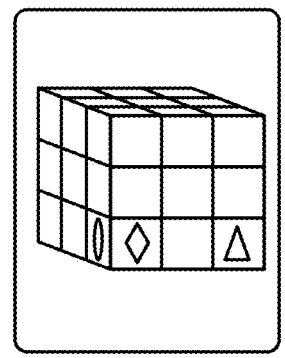
Figure 2D:
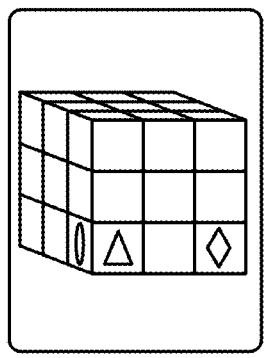
Figure 2E:
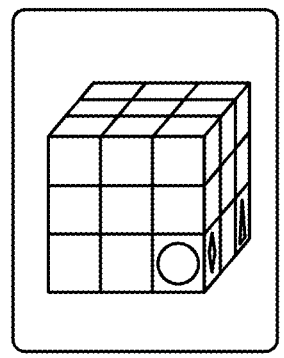

With respect to transitions and splat user interaction, various animation transitions, based upon rules or the like may be used. For example, consider that as in FIG. 2B, a user interacting with a splat grid structure wants to swap a splat (represented by the triangle) on with another splat (represented by the circle). The user swipes his or her finger from the triangle splat towards the circle splat, which starts rotating the grid structure via animation. At a certain threshold, e.g., eighty percent, the grid structure "front" face changes. However, the diamond splat and triangle splat are reversed (FIG. 2C, which may not be made visible to the user, or may be animated to transition to FIG. 2D), and are thus swapped (FIG. 2D). At this point, the triangle splat and circle splat are swapped as desired as shown in FIG. 2D. FIG. 2E shows the grid structure of FIG. 2D further rotated so that the circle splat is now on the front-most face.

The transition animations may be defined by default, by the source or the destination. Alternatively, the transition animations may be negotiated by the source and the destination. It is also feasible to not have animated transitions, e.g., to simply jump from a source to a destination, however this does not give the user a sense of the interconnection of pods, splats and so forth.

Turning to another aspect, a "voxel" is a three-dimensional data container that may be docked on the corner of a pod, or on a corner of another voxel. A voxel holds its information on the vertices of a grid. Voxels can nest virtually infinitely, and one zooms in and out to access the voxels that are nested deep within. Each voxel may be a grid or it may be a pod. A grid itself may hold only voxels or only splats or both. A user can take a voxel out of a grid and splat it. A user can undo a splat into the original or grid structure and then can voxel it. Thus, the structures are entirely transferable between voxels and splats. Moreover, the structures may have an independent non-docked existence when they are neither a voxel nor a splat but their own independent island of application and information.

Figure 3:
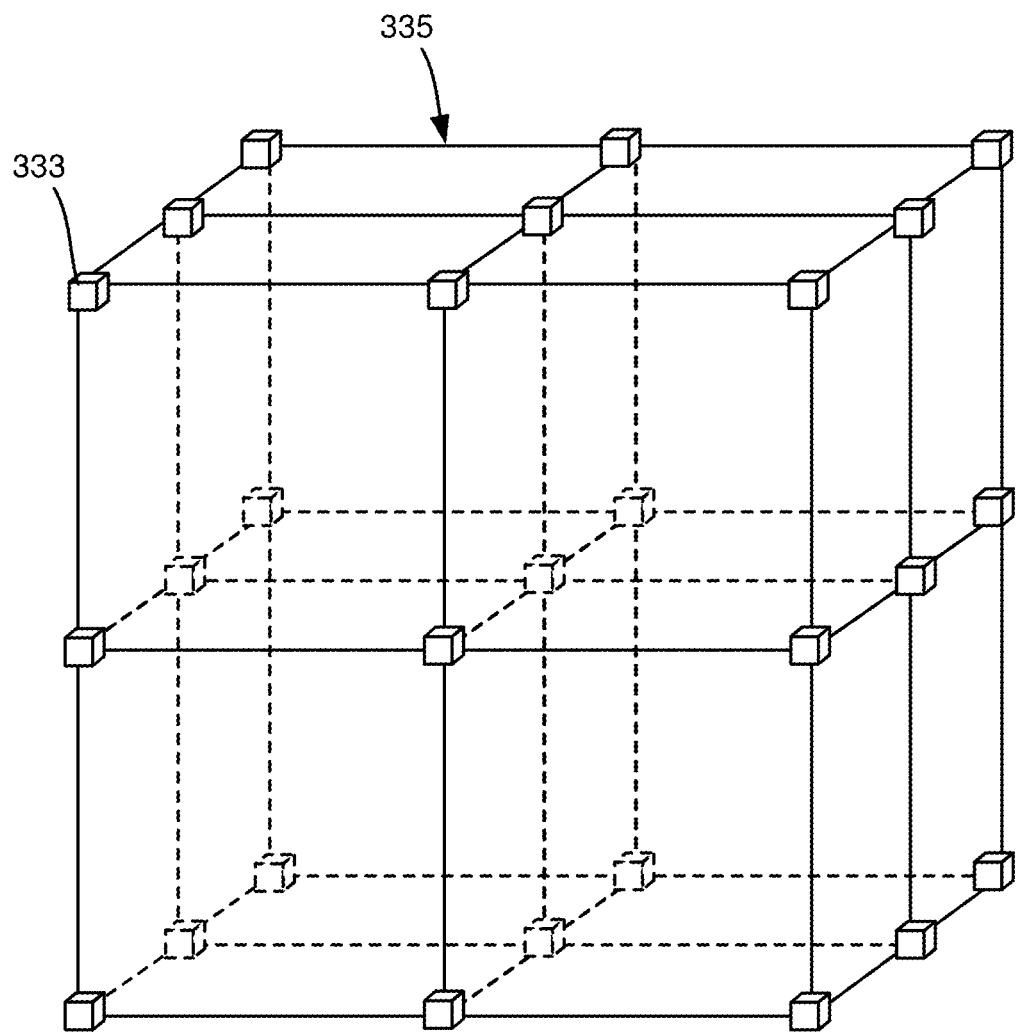
FIG. 3 illustrates an example representing voxels on a grid-frame data structure comprising pods arranged as a grid-frame, in accordance with one or more embodiments described herein.

By way of an example, FIG. 3 shows the concept of voxels (e.g., voxel 333) on a grid-frame data structure comprising eight pods arranged as a 2×2×2 grid-frame data structure 335. Note that FIG. 3 shows relatively "small" voxels with respect to the grid structure for purposes of illustration, however in one or more implementations, the size of the voxels may be relative to one another. Note that a voxel grid may be a 2×2×2 grid-frame data structure, a 3×3×3 grid-frame data structure, a 4×4×4 grid-frame data structure and so on.

Figure 4:
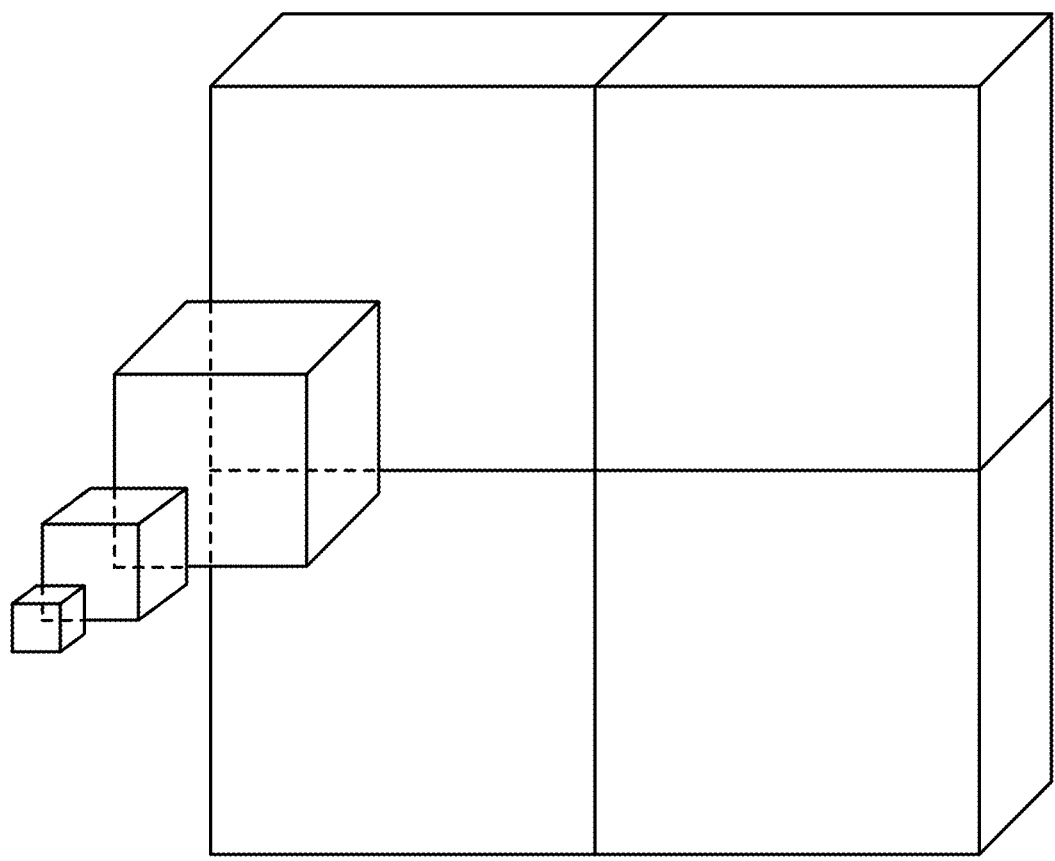
FIG. 4 illustrates an example of relative sizes of voxels, including a voxel having smaller and smaller voxels attached, in accordance with one or more embodiments described herein.

For example, in FIG. 4, each smaller voxel is displayed as fifty percent of the size of the larger voxel or grid structure to which it is attached. Note that FIG. 4 also shows the concept of a voxel having smaller and smaller voxels attached thereto; there is theoretically no limit in either the increasing or decreasing size direction (although there may be a practical one on a given computing resource or set of resources). Note further that the actual size of a voxel as represented to a user is not related to the amount of data that may be stored on a voxel, which may be huge.

Figure 5A:
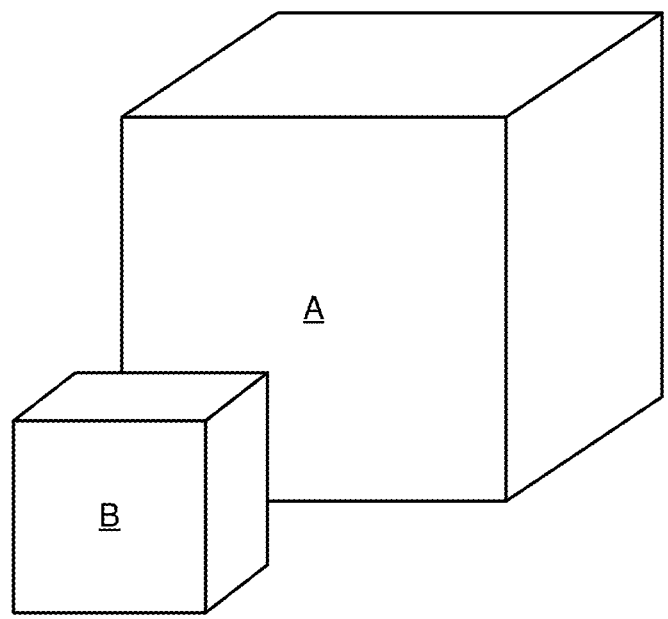
FIGS. 5A and 5B illustrate an example representing zooming a voxel based on user interaction, in accordance with one or more embodiments described herein.
Figure 5B:
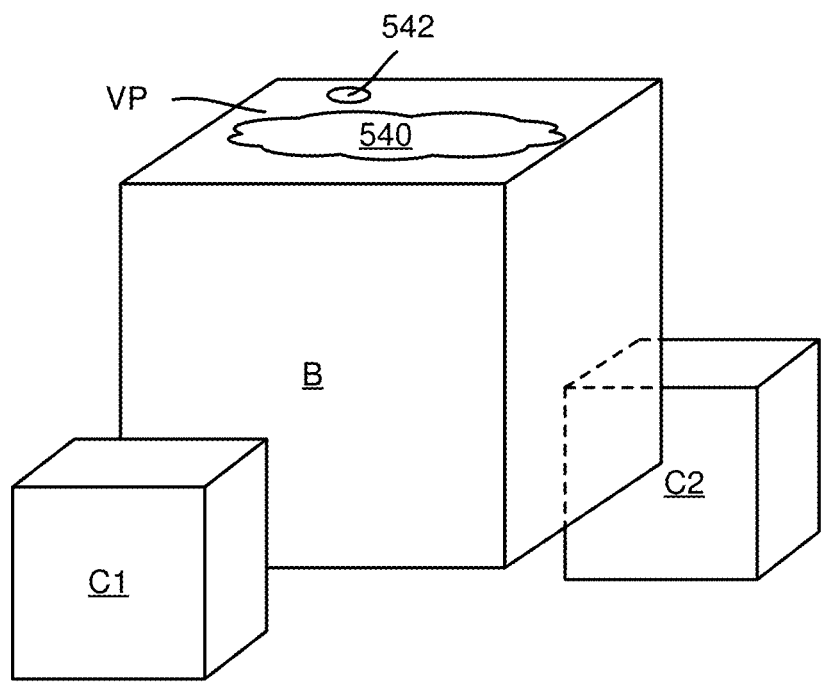

As can be readily appreciated, because voxels get smaller and smaller, a given voxel may be too small to view. By interaction, a user may "zoom in" on the data of a voxel and zoom back out; the voxel data may be located anywhere, e.g., on a remote server. For example, consider that in FIG. 5A, a large voxel A has a smaller voxel B attached to a corner. None of the voxels attached to B are shown. However, when the user interacts with voxel B, as shown in FIG. 5B, the voxel B is "zoomed in" to show its voxels C1 and C2, each of which may now be interacted with. Note that a voxel may be rotated by interaction to allow access to a voxel attached to its back corner, for example.

It should be noted that transition animations are desirable with voxel interaction. For example, instead of "jumping" from FIG. 5A to FIG. 5B, an example transition animation may be to slowly increase the size of voxel B over time, while fading voxel A out and fading voxels C1 and C2 in as B grows.

Also shown in FIG. 5B is the concept of a video plate VP, which corresponds to a face of a voxel. Any face of a voxel may contain data; for example, a user may insert an image/2D art 540 onto a video plate, draw on the video plate (e.g., over the 2D art 540 or draw alone without 2D art) and so on. A video plate may contain text, graphics, video, audio, animations, and so forth. A contributing user may, for example, put information on a single plate, and share it so it then may be placed onto a grid, and so on. One or more anchor points such as the anchor point 542 may be put onto a plate, and if interacted with, used to zoom into another 2D plate, play audio, and so on. In general, the topological structures of the video grid allow one to zoom in and out of 3D pod and grid structures, in and out of 2D planar structures, and then also transfer back and forth from 2D planar structures to 3D grid structures.

Figure 6:
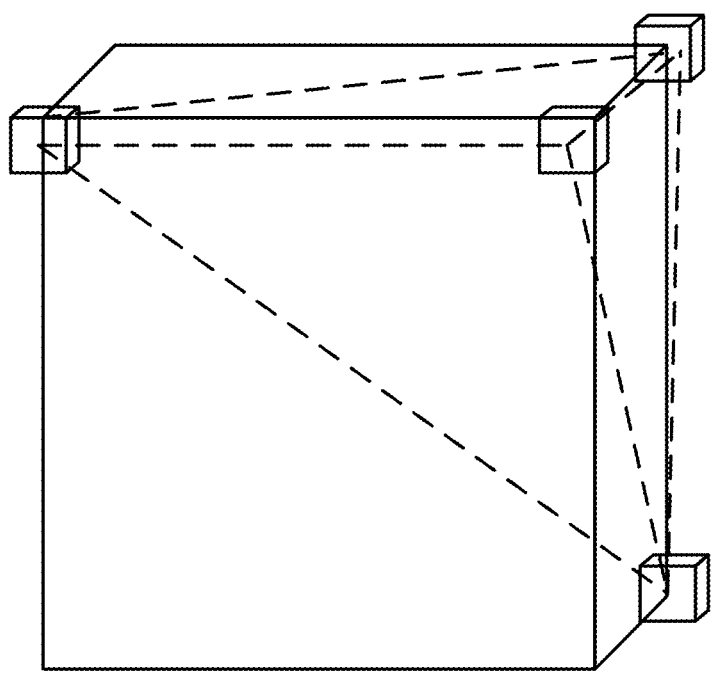
FIG. 6 illustrates an example in which only certain corners of a grid structure have docked voxels, in accordance with one or more embodiments described herein.

Not every corner needs to have a voxel. For example, in FIG. 6, (again using small voxel sizes for purposes of illustration), only certain corners of the structure (which itself may be a voxel) have docked voxels. These smaller voxels form a constellation of voxels, each which may reference one another via worps, each which describes the interconnection between two elements. Worps also may be associated with transition (e.g., animation) parameters, as well as protocols or the like for communicating between elements. A splat, voxel or pod (containing splat(s) and/or voxel(s)) may have one or more worp(s) to other splat(s), voxel(s) or pod(s).

A worp may include transition information that may be contingent upon where the source and destination are located. Consider for example that a worp is maintained in a voxel, as represented by the dashed line between two voxels maintained on the same structure. If the user selects a worp to another voxel on the same structure, the structure may zoom out to show the structure, rotate to show both voxels at the same time, animate a beam traveling to the other voxel, and then zoom in the other voxel.

In contrast, if the worp is to another structure, the worp may specific animation parameters so that the source voxel structure is zoomed out to show its position in a "starfield" or the like, along with the other structure also appearing at another position in the starfield. A beam or the like may be used to show the transfer via the worp to the other structure, followed by zooming into that structure's worped-to voxel.

The system also has the intelligence to deduce, based on the topological relationships, what type of animations may work best for a worp transfer. This decision may depend various heuristics that the system will employ.

While the users have the flexibility to arrange the topology and the docking, it is possible for the system to apply its own intelligence based on different heuristics on how different docking arrangements may be made available for different users and applications. In this way, the docking system may stay very dynamic, and for example, as the system learns how users use parts of the 3D graph, the system may rearrange parts of the graph for different reasons, such as including, but not limited to, efficiency, demographics and user behavior.

As grids and voxels are closed surface structures in one or more implementations, the users can use the space within the surface structures to create descriptive 3D worlds that support the intention of what the pod or the grid is being designed for. So, for example, the 2D information lives on the surface of the pod, or the grid, or on splat structures; the 3D worlds can be accessed either by worps or by having transparent plates. To get into 3D from a 2D surface and vice versa, the system provides different transition options on how the transfer may be animated for the user. The video graph operates at different times and locations in 2D, on 3D surfaces and in full 3D, and sometimes video graph can be viewed simultaneously in more than one of these modes.

The animation between voxels (and likewise splats) is gives the user a sense of connectivity in a structure or in a universe. A user may view what is docked or what is worped to, and also may elect to dock structures together.

Figure 7:
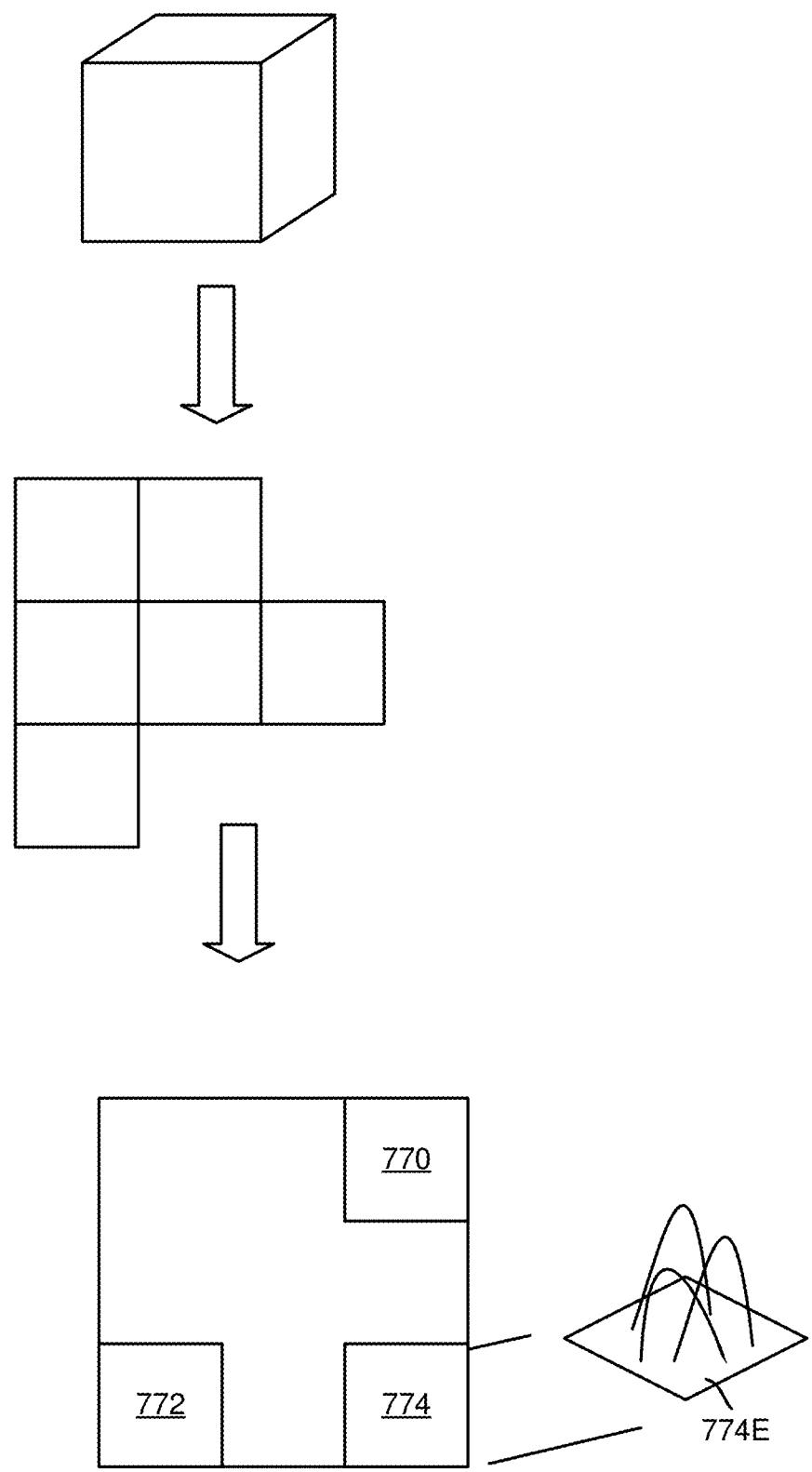
FIG. 7 illustrates an example structure having six faces unfolded into splats and "pasted" onto one face of another structure, in accordance with one or more embodiments described herein.

Turning to another aspect, FIG. 7 shows a structure having six faces unfolded into splats and "pasted" onto one face of a 3×3 structure. As can be seen, this leaves three empty squares 770, 772 and 774. These squares may be used for maintaining any other data/metadata, including (optionally) a square 772 for one or more voxels, to provide advertising 770, and associate the face with a 3D/iconic signature. Thus, in the grid, this splat corresponds to the signature, e.g., as shown in the enlarged image 774E.

Figure 8A:
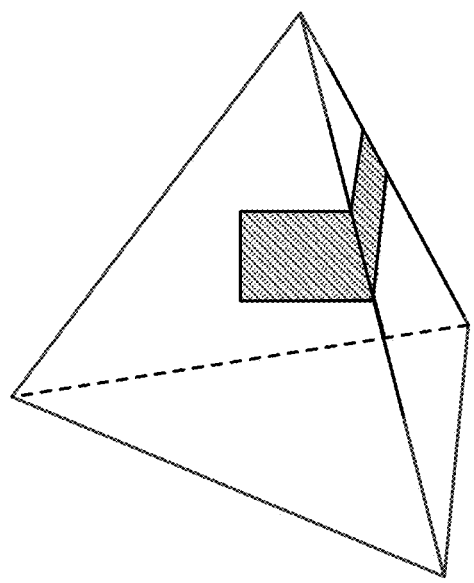
FIGS. 8A and 8B illustrate an example of viewing information on a triangular face of a tetrahedron.
Figure 8B:
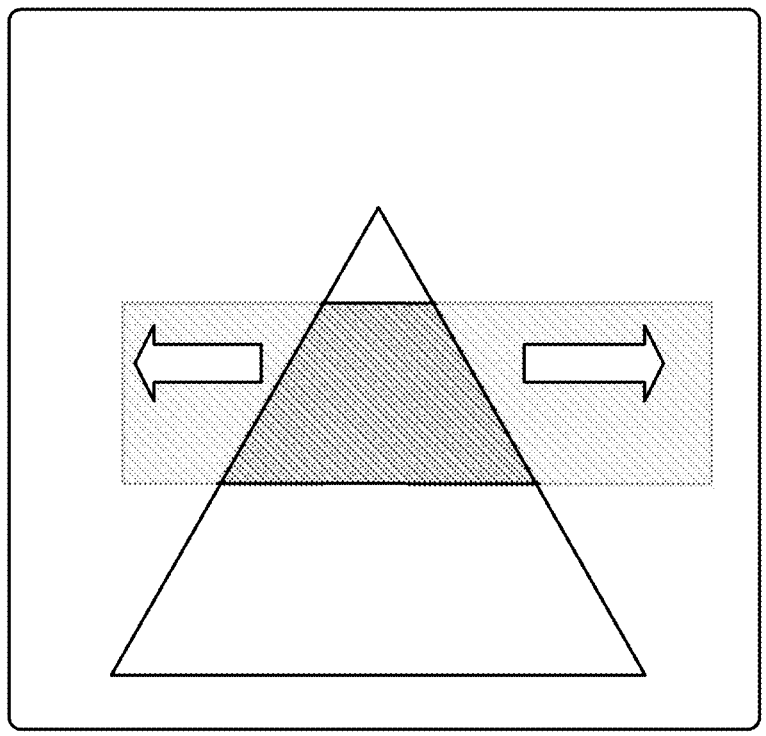
Figure 9A:
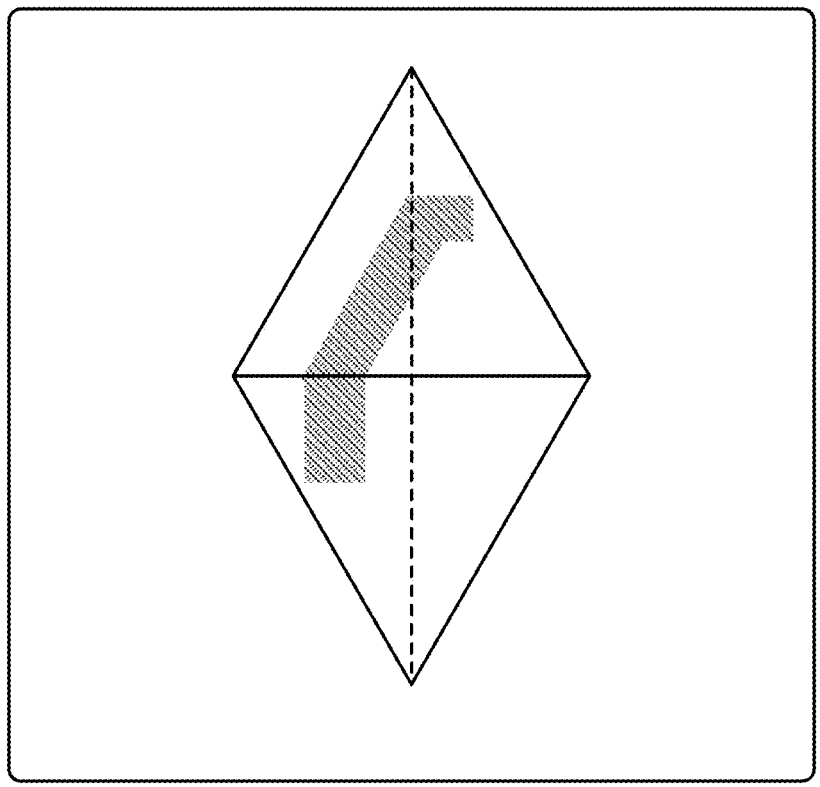
FIGS. 9A and 9B illustrate an example of panning of the image behind a triangular viewing window, in which the viewed structure flattens, in accordance with one or more embodiments described herein.
Figure 9B:
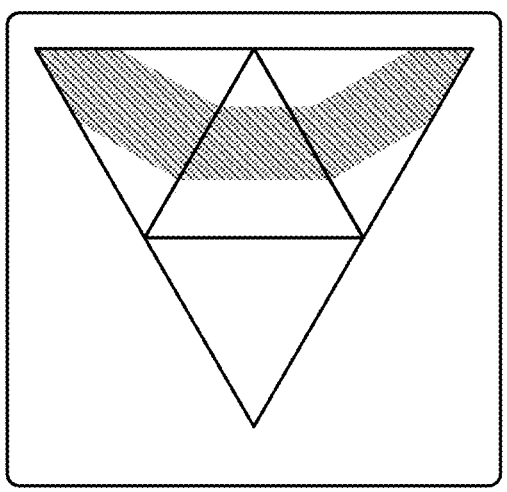

FIGS. 8A and 8B, along with FIGS. 9A and 9B, show another aspect, namely viewing information on a triangular face of a tetrahedron. FIG. 8A shows the information maintained on the structure, while FIG. 8B shows how a user may view a representation on a 2D screen. Panning of the full image behind the triangular viewing window may be automatic so that a user/viewer understands that only the triangular window is being viewed, and that more information is available. If the user selects the image to zoom in or the like, the structure "flattens" as in FIG. 9A (or possibly FIG. 9B) to show all of the sides at once in two dimensions.

Figure 11:
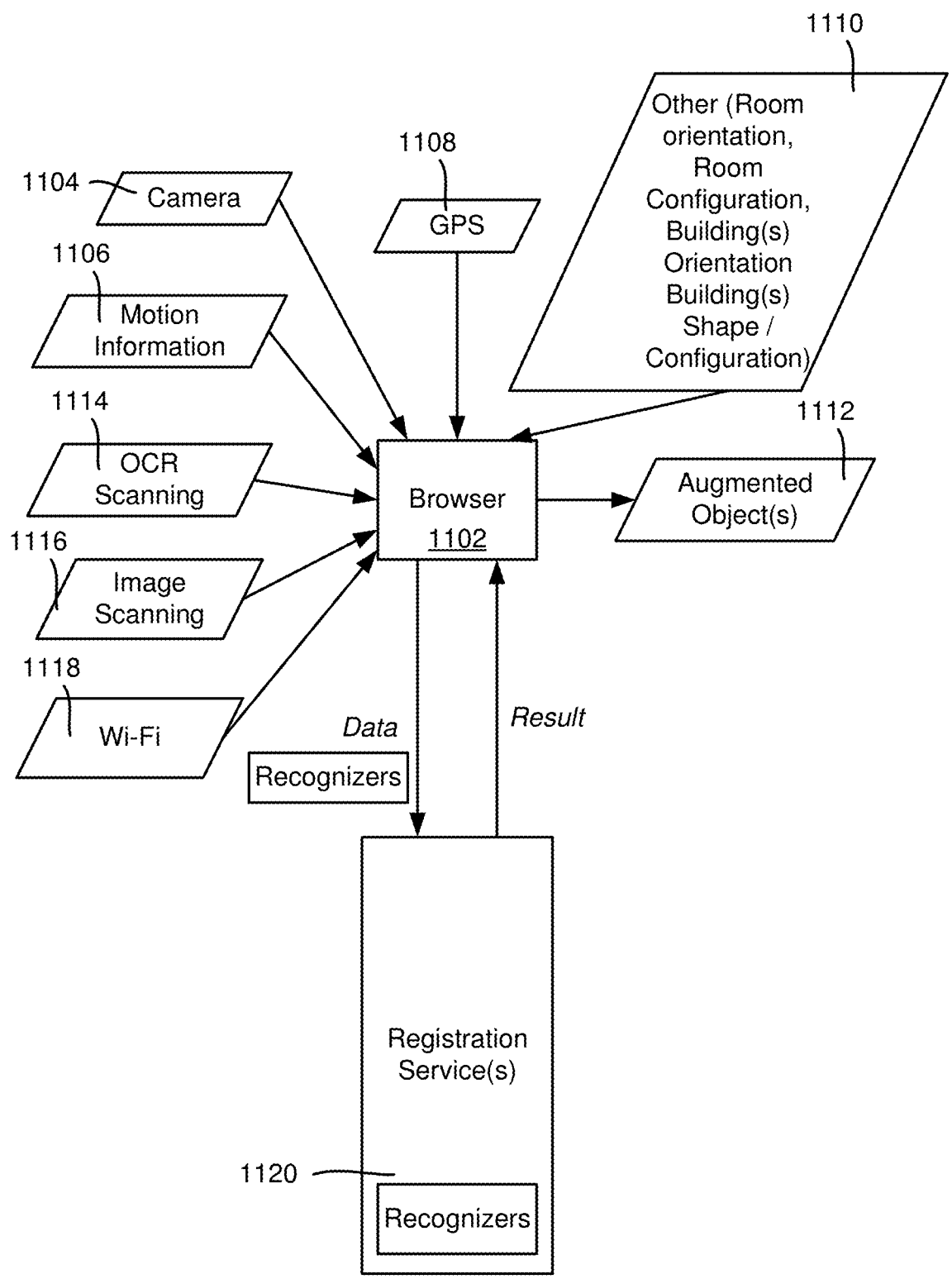
FIG. 11 illustrates a computer program, e.g., a browser, that renders augmented objects, in accordance with one or more embodiments described herein.

FIG. 11 shows a computer program for outputting augmented data, in which the computer program is implemented as an augmented browser 1102. As is understood, a browser is only an example, and indeed, one or more operating system components, applications and/or the like may implement the computer program technology described herein.

The browser 1102 may comprise a single universal-augmented browser, which can obtain various data from various input sources, and test the data against a registration service to recognize objects basically anywhere. The browser obtains the data, such as in the form of camera data 1104 and motion information 1106, along with GPS information 1108 and/or other recognition information 1110, for making the recognition such as to augment an object 1112, displayed by the browser (e.g., on a screen, in glasses, goggles, a heads-up display or the like). The recognition can be universal, so the browser can rely on one or multiple sources of recognition evidence to make a precise understanding of global location and orientation. The multiple sources can include (but are not limited to) GPS and other location services (e.g., cellphone location), OCR scanning 1114, image scanning 1116, Wi-Fi 1118, and other information such as including but not limited to room orientation, room configuration, building(s) orientation and building(s) shape or configuration.

There can be a single registration service 1120, or multiple registration services that split the registrations between them (e.g., geo-distributed for reduced latency as well as possibly to provide redundancy, etc.). If multiple registration services exist, then the browser accesses the needed registration(s) from one or more services to recognize augmented objects at its current location.

An augmented object such as the object 1112 is any object that can be projected into augmented reality space. An augmented object can be a 3D object, a 2D planar object or an object that is set of surfaces as in a cube, tetrahedron or similar shape. An augmented object can also be 2D information that is arranged as a single 3D planar plate. This single plate can have fixed orientation while the camera moves, for example, or can be set so that the plate rotates in place, e.g., to generally always face the camera. An augmented object can be augmented with audio instead of or in addition to visible augmentation.

Provided the registration is well defined and recognizable, the technology described herein is able to scan the physical environment, understand an object's location and placement, and optionally its orientation, scan the frame for specific recognizers, compare them against information registered in the registration service and then trigger any augmented objects that need to be displayed. This browser for the augmented world can flexibly locate any augmented objects provided they are registered or have the correct registration information that is accessible to a crawler.

While the objects are attached to an augmented world, they can be triggered through many different recognizers. The system allows for a flexible hierarchy of recognizers; when a recognizer is triggered a pod can be displayed. A recognition can be a GPS coordinate, an estimation of room structure and orientation leading to a more precise location within a room. A recognition can be based on (at least one) character, symbol, label or image, which can be further made precise with compass orientation. By way of example, a recognition for retail spaces can be based on rack arrangement and location, and this rack location can be further corresponded with a physical map arrangement. These recognizers allow the system to flexibly place objects in augmented space, and position them with a flexible precision.

Figure 12:
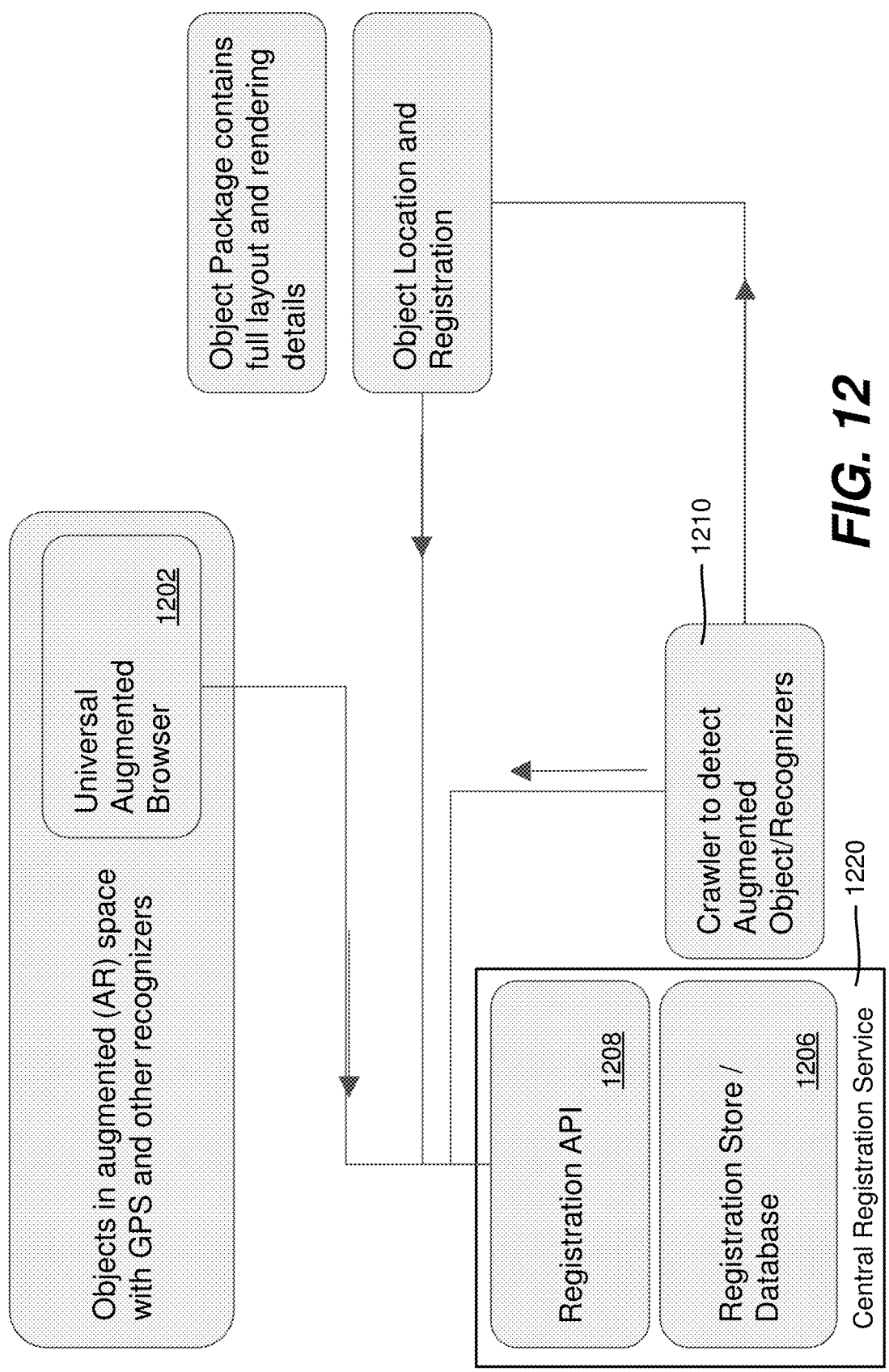
FIG. 12 illustrates a registration service that registers augmentation data and provides augmentation data for outputting augmented data, in accordance with one or more embodiments described herein.

As generally represented in FIG. 12, the recognizers can be arranged in a central registration service 1220, which can use a database, or similar store (block 1206) to store the registration. A single registration can include one or more location recognizers (e.g., a GPS coordinate and a room location) and the link to the storage where the content and layout of the objects are stored and any additional information that is needed to fully render the object in an augmented setting. The link can be a complete URL or a partial URL with an object identifier through which it is possible to locate the content.

The registration can be explicit where a call to the service (e.g., via an API 1208) is invoked to enable the registration. Once the registration is enabled it may be checked that it does not conflict with other registrations or does not have any irresolvable ambiguity that will prevent a full recognition. Once a successful registration is made with the service any installed augmented browser/application has the ability to recognize the registration.

It is also possible for objects to be triggered without an explicit registration against the central registration service. In this option, the objects and their recognizers can be distributed with different hosting providers, somewhat similarly to how currently Internet websites are distributed with different hosting providers. Then a crawler 1210 coupled to the central service 1220 can exhaustively or selectively crawl the web to locate these objects and their recognizers and when it discovers an object and its recognizers, the crawler registers them automatically in the database/store 1206. Thus, described herein is a universal format that allows crawlers to locate registration information automatically by crawling to discover these objects.

This allows the augmented browser to locate augmented objects and their recognizers at any conceivable location provided that they have been registered explicitly or through the crawler.

Based on the type of recognition, the augmented objects can be city level, street level, roof based, floor plan based, home based, retail based, hospital based, hotel based, crate based, auto attached, package based or signage based, and so on. Each type of augmented object attachment can be based on a combination of one or more location recognizers. Most often the augmented objects also register a GPS recognizer; this allows the system to more efficiently search for a recognizer instead of having to do a global search.

In the case of other recognizers like crate, package or auto augmented objects, the augmented object can be attached to a mobile recognizers; this can change the mechanisms on how the browser will recognize mobile recognizers. Here an auto refers to any transport vehicle for people or objects, e.g., a car, truck, train, plane, forklift, bicycle, dolly, or any other engine or motor driven and/or human powered moving vehicle or the like.

The browser can operate statically, where there is not significant GPS changes across frames. For example, this can be implemented in a hand held device where the person is on foot and locating augmented objects that are registered against generally non-mobile (or static) locations. The browser can also operate when person is on foot and the augmented object is located on a moving auto vehicle, like a similar passenger or crate-carrying vehicle. In yet another situation the person and their browser device (or an automated browser device) may be travelling in an auto vehicle and locate augmented objects that are on static recognizers while they are being passed by. In another situation both the person and their browser (or just the browser) can be moving in an auto vehicle while recognizing objects (which can be a person) that are also moving in their auto vehicles. These forms of recognition allow the browser to flexibly discover augmented objects independent of the movement of the camera or the movement of the object itself.

Figure 13:
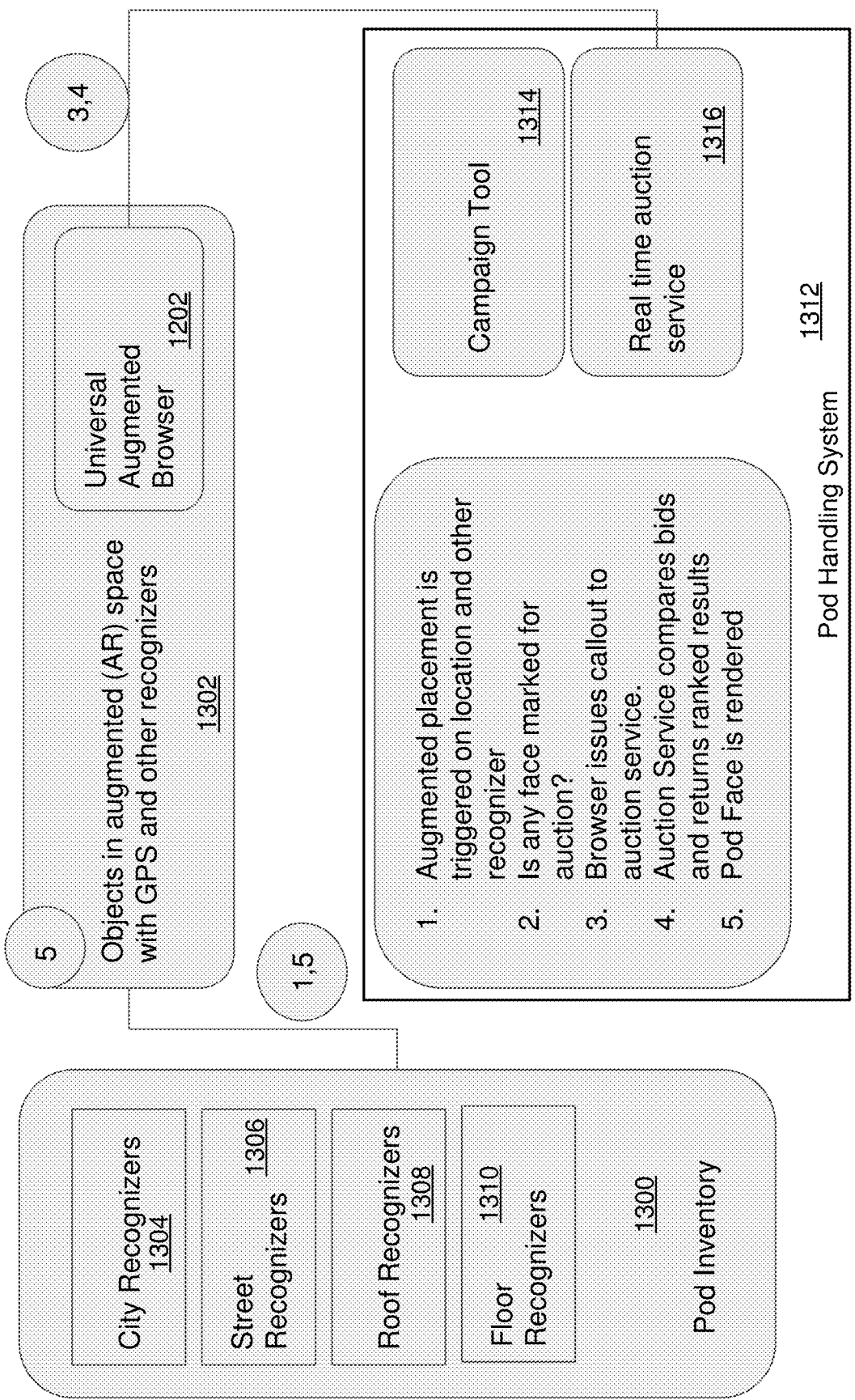
FIG. 13 illustrates a system that sells, auctions and/or uses pods for outputting augmented data, such as auctioned advertisements, in accordance with one or more embodiments described herein.

Turning to another aspect generally represented in FIG. 13, video pods as described herein can be considered as real estate inventory 1300 in augmented space. Based on their mode of recognition, non-limiting example video pods can be city level pods, street pods, roof pods, floor pods, home pods, hospital pods, crate pods, auto pods, package pods or sign pods, and the like. Each type of pod attachment is based on a combination of one or more location recognizers, e.g., city recognizers 1304, street recognizers 1306, roof recognizers 1308, floor recognizers 1310 and so on. A pod handling system 1312 may pre-arrange blank pods across the city, street and shop, and then auction the pod inventory to display different forms of advertisements such as video ads, photo ads, animation ads, coupons, discounts, offers and others.

The system 1312 can statically sell the inventory where a face (e.g., a planar face) on a pod for some amount of revenue is allocated to one or more marketing campaigns (block 1314) for some allocated amount of time. A pod face can be placed in an auction market (block 1316) where advertisers allocate campaign budget against a specific augmented location, potentially made more precise with different recognizers, or also against mobile recognizers.

By way of example, in an auction system, the system 1312 can run the auction in real time at the point in time the pod is supposed to be triggered to display an advertisement on the pod face, which the browser 1202 can render as an augmented object 1302. The system 1312 can, for example, weigh the different bids from any active campaigns at that location and time and rank them and submit the top ranked bids to the pods. In an auction model the inventory is generally sold at a price that is based on the bids submitted. So the auction system is set up to auction augmented real estate inventory. As in a traditional auction, the demand supply ratios will determine how the inventory gets priced.

The inventory available for sale or a single auction can be the number of faces on one pod or a group of pods. Not all faces need to be in the sales or auction pool. Once the sale is complete or the auction is processed and the results of the auction are ranked, the ranking can be a factor in when and how the winning bids are displayed on one or more faces. The ranking might also influence how long the bid is carried on a particular face.

Typically a face carries only one advertisement at a time until its allotted time runs out or the campaign budget is exhausted. However, the system might cycle a face through its top-ranked advertisements allowing users to click through the advertisement that works best for them.

Not all faces of the pod need to be sold or auctioned. For example, other faces can have local information that is directly beneficial to the consumer at their current location. Thus, other faces might contain location and time keyed information such as weather, events, local maps, real estate open houses, yard sales, emergency services etc. Thus, to fully render a pod, a system might access static inventory, dynamic programmable services, auction services and partner services.

Figure 14:
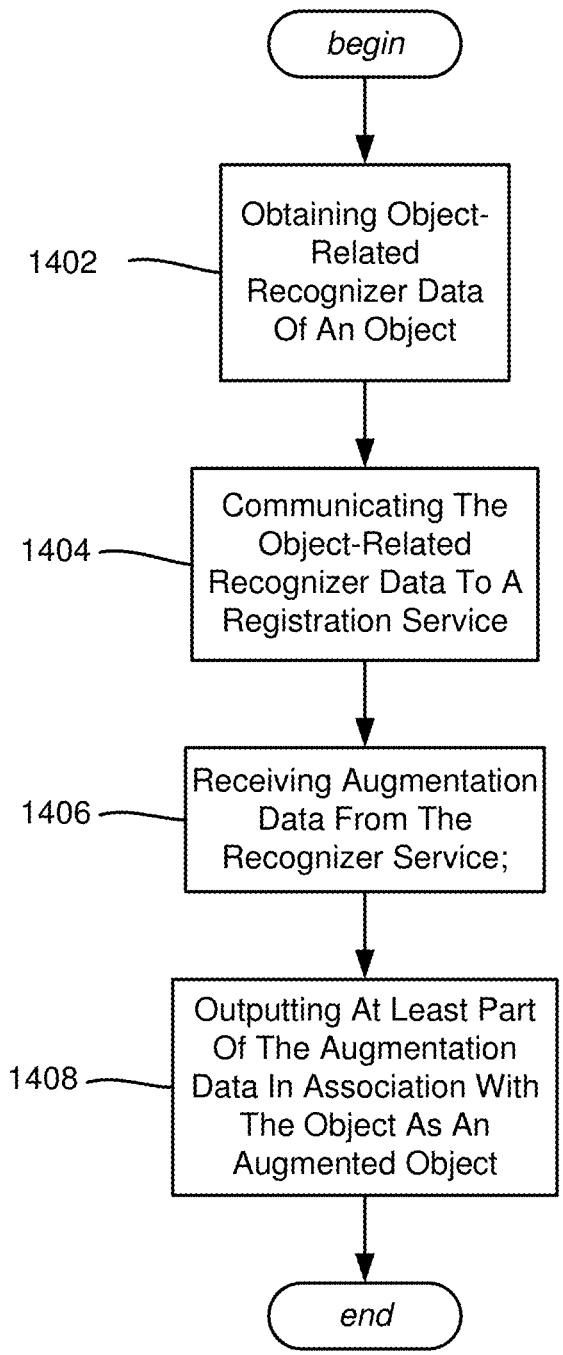
FIG. 14 illustrates a flow diagram of an example, non-limiting computer-implemented operations directed towards outputting augmented data, in accordance with one or more embodiments described herein.

FIG. 14 summarizes aspects in the form of example operations. Operation 1402 represents obtaining object-related recognizer data of an object. Operation 1404 represents and communicating the object-related recognizer data to a registration service. Operation 1406 represents receiving augmentation data from the recognizer service, and operation 1408 represents outputting at least part of the augmentation data in association with the object as an augmented object.

EXAMPLE APPLICATIONS

One example of how the above topology and constructs may be used is adaptive learning. Unlike textbooks, which are generally linear (with only the ability to manually skip certain parts), adaptive learning allows immersive participation in a 3D world. A "velo" (or "shuttle"/"walkthrough"/ "hover") is one way in which a conventional textbook may be replaced by an immersive learning experience that need not be linear.

For example, a velo, which may be selected by interaction with an anchor as described above, is generally a recorded demonstration/teaching video. However, unlike a conventional video, the velo may be stopped by the viewer at any point to allow manual interaction by the participant (e.g., student) to vary the experience by exploring the world on his or her own. For example, the student may be shown a door during the velo, pause the velo and open the door to interact with other video content (although the door ordinarily would not be opened as part of the regular velo presentation). The student may relinquish control and resume the regularly planned velo experience at any time. Users have all the options to navigate the video graph experience using worps and zoom in and out of voxels and splats.

As will be understood, creators of the video graph thus may offer up a "velo" experience that is like a guided walkthrough so that the user can experience the video graph in a more passive manner, where it unfolds more like a regular video; but unlike a video the user can pause a velo and while paused, start actively navigating the experience, and get back to continue the velo at a later time. Velos can be linked to create optional paths where one velo might conditionally branch to more than one velo. Thus, while they are the couch equivalent of the television experience, velos have significantly more versatility in how they may be linked together to create interesting pathways through the video graph.

Different velos may be assembled for different participants, e.g., students at one "advanced" level may be given a different velo than students at a lower level of skill or knowledge. Different experiences within a velo also may be based upon per-participant criterion, e.g., the above mentioned "door" may be locked to certain students but not others.

Feedback may be part of assembling/editing/refining a velo. For example, feedback along with analytics may indicate that many students tend to pause at a certain point and perform some other action that is not part of the velo, perhaps because more information is desired at this time, or because something is confusing. The velo may be edited to include this action. Similarly, because the equivalent of fast forwarding and rewind may be available to participants, feedback may indicate an uninteresting part (skipped over or fast-forwarded through) or a part that likely needs more time (rewound and replayed often).

Another way that a velo may be non-linear is via conditional paths that may be part of a velo. For example, a user virtually walking through a museum via a velo may be given a choice to go see a dinosaur exhibit or a mummy exhibit. One or more paths may be chosen for a participant based upon virtually any criteria, e.g., a young student may be given a censored PG-13 path whereas an adult student gets the fully non-censored path. A path to another expert's velo (or part of the expert's velo) may be made available to interested participants, e.g., a velo by an expert in in impressionist paintings may be made available to general art history students who are particularly interested in that more specific topic. Programmatic control/artificial intelligence may be used to determine which path to take for a given user at a given point in the velo, e.g., what is best for a given student. History may be considered; for example, one user who already experienced paths A, D and C may next be given path B, whereas another user may have gone through paths A, B, C and thus be given path D, in regular order. A velo may thus diverge to different paths, and return to a common point.

Different paths may be made available based upon payment. A velo may be used to attract participants to a longer, possibly paid version. Advertising may be used in a velo, e.g., a user may be shown a velo that demonstrates a car; one user may choose to open the car door and "sit" inside, while another user may choose to look under the hood, and so on.

Velos may be live streamed and/or recorded at any time, including as a user experiences a velo, or as the source of the velo (e.g., a teacher) assembles the velo, edits the velo and so on. Thus, a surgeon going through a velo of a heart operation can be observed by medical students. One teacher can view another teacher's assembling/editing of a velo.

Advertising may be associated with a velo or part of a velo. For example, a drug company may bid to have a drug that lowers cholesterol associated with one part of the heart surgery velo, while a medical device manufacturer may bid to have a piece of equipment associated with another part of the heart surgery velo. Advertising is available in pods and voxels and grids; a velo might also optionally render its own advertising as part of the velo experience. There will be entirely new models for how advertising is served. Advertising inventory may be made available in the form of voxels or pods or single pod face or unused faces in a splat. Advertising may occupy the 3D space within a pod or a grid. The system offers video graph creators ways to mark and reserve advertising inventory that will be made available to advertisers.

During a velo, as well as on any video plate or other anchored point, there may be lead audio that automatically plays at a certain point, as well as "tap" audio that allows the user to selectively play audio. Thus, for example, a user may be given an audio introduction to a heart surgery velo, and selectively tap on an aorta audio to hear a recorded verbal description of this part of the surgery, and maybe later select a ventricle audio verbal description, and so forth. Lead video and tap video, which may or may not be automatically accompanied with audio, are similarly provided.

Figure 10:
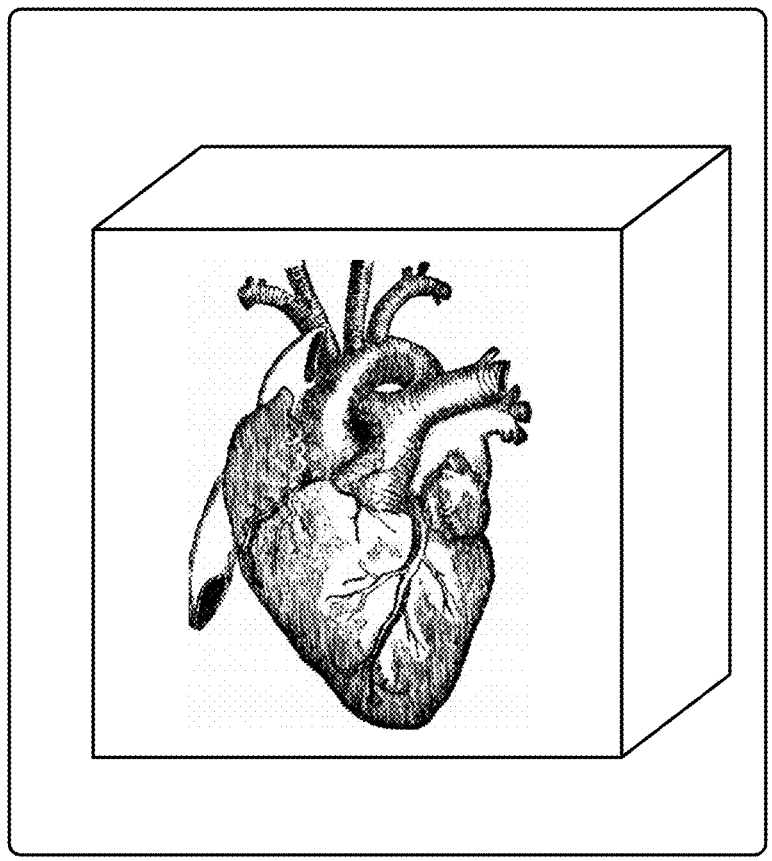
FIG. 10 illustrates an example application in which a 3D world is assembled in a pod, in accordance with one or more embodiments described herein.

Another application allows an entire 3D world to be assembled in a pod. For example, as shown in FIG. 10, in which a pod has transparent walls (rather than opaque walls as if sticking images onto them), a 3D world showing a heart is assembled. A user may write on the transparent "glass" or the like that surrounds the 3D world in the pod. Opacity may be controlled, including at different locations, e.g., certain perspectives may be blurred or blocked.

A 3D world can be any size. For example, the data of a very large enterprise may be contained within a single structure, with sub-structures for its departments, sub-structures for each department, and so on. Hotspots and the like may be indicated to a viewer, e.g., the IT department's data is very active right now, whereas the finance department's data is not particularly active. When a video graph is zoomed out it can compress a lot of information to be seen in a single glance. There are different overlays that can provided on top of the video graph including which parts of the video graph are more active relative to other parts, and these overlays might automatically become visible at certain zoom levels. The overlays can optionally use lighting and color information to overlay the video graph.

A 3D world can be presented in a 2D video, such as if filmed with a 2D camera that can pan, zoom, remain still and so forth.

Search is another possible option with results arranged in 3D. Instead of a linear list of websites, sorted by relevance, an arrangement of 3D structures may be used to represent results. This allows a searcher to more quickly locate (e.g., like a binary search versus a linear search) a desired result, by zooming in to more and more relevant content via the voxel arrangement, e.g., with a general voxel containing more specific voxels which in turn contain even more specific voxels and so on until the desired result is found.

A 3D file system may be provided via the structures by having voxels maintain 2D and 3D objects instead of having 2D hierarchical folders. Again, this allows for binary search-like speed.

As another example, consider a user interface using voxels. A "home" screen can have "favorite" voxels attached thereto, such as a weather voxel favorite. The voxels of the weather voxel can be something more specific, such as different zip code voxels, with each zip code voxel having a 10 day forecast voxel, a radar voxel, and so on.

Another aspect is a bridge concept, which allows transitioning between a 3D virtual reality/augmented reality viewing experience and a video graph that is experienced on a more traditional 2D device like a tablet or a video graph. For example, one set of students may be immersed in the 3D experience via 3D goggles or the like, e.g., in a museum, while another set of students (possibly thousands of miles away) may view a 2D video as if captured through the eyes of an immersive experience student on a flat screen, projection device/screen, tablet and so forth.

The bridge also allows for supervision and tracking. For example, a teacher may allow one student to "wander" freely throughout the museum, but control the experience of another student to limit that student's experience to a certain exhibit. Via a bridge and controls, a teacher may reign in a student at any time, establish a boundary and so forth.

SUMMARY

As can be seen, much like the 2D web came up website by website, the video graph similarly is able to evolve pod by pod and patch by patch. The 3D deep video is a paradigm change. Further, scaling of the experience is relevant to completing the experience of the video graph. Somewhat like fractals that provide endless levels of scaling, the 3D worlds scale in and out, and the topological elements provide structural reinforcement as users interact with them.

Moreover, unlike a traditional video that is sequential with limited control, the experience that the video graph provides may be non-linear. Each user freely may work out his or her own permutation of an experience. The video graph comprises an operating system fabric that may stretch across virtually all tablets and mobile phones. It is able to sit atop of existing operating systems, (with the traditional operating system providing underlying device and client "plumbing" operations as needed).

With the video graph, the separation between client and cloud as it exists today basically disappears; (or exists so far down in the plumbing that users do not care that it exists). Another legacy separation that disappears is the distinction that exists today between web creators and web consumers. Today the browser is the application for consumers and there are multiple models for creators. The video graph browser on the other hand allows one to consume and create equally; recognizing that many users in a new generation of users will participate in both activities.

The definition of this new fabric is based upon the above-described topology, which may be extended as new applications and the like arise. As shown above, the topology defines how things come together, and allows the fabric pieces to dovetail into each other to deliver an immersive experience. The topology allows creators who construct the patches to understand and define how their pieces will fit together, e.g., pod construction may be somewhat analogous to an assembly line, which may be streamlined so that new experiences are built with efficiency and minimal friction.

Pod creators may outnumber conventional asset creators by many orders of magnitude because every desktop, smartphone, tablet and so on user may be a pod creator and consumer. Once a pod is fully constructed, the video graph described herein arranges for its distribution, as well as its own distribution network. As long as 2D and 3D environments coexist, the video graph allows reaching into 2D distribution systems.

The fabric has elements which allow third parties to customize and build experiences, yet the core remains constant and predictable. Example scenarios include classroom learning, advertising and healthcare. Textbooks may cease to exist, with instruction released in the form of video pods that support fully adaptive learning, e.g., to accommodate different learning capacities. Video pods can be basis for such education, as well as the platform for formative assessment as well; e.g., students can reflect what is in their mind into a pod structure and give evidence about where they are in their learning.

A superior advertising product may be provided as well. A user may walk through an advertisement, selecting and engaging constantly with it, provide truly interactive advertising. One user may respond to an electric car advertisement and be pulled one part of the pod to see the electrical drive mechanism, while others may be drawn to statistical details with which they can interact to experience how well the car performs on city and highway roads. The advertising agencies may have a variant of the video pod product that allows them to create rich dynamic interactive experiences.

Users who build pods have the option of adding worps that lead to interactive advertisements, and also allows them a revenue model. The simplicity of pods, worps and docks facilitate assembly of a new generation of such experiences Another example usage is in healthcare. For example, biologics have been increasingly researched for the treatment of some autoimmune diseases like psoriasis. These biologics have become increasingly precise in their action and they can alter the targeted immune responses of the body. Video pods allow physicians and trial researchers to convey the impact of their particular drug and the immune response to participants in the clinical trial; (note that doctors in clinical trials are unlike regular physicians, as they have a lot more time that they spend with the patient to explain the pathways for the biologics). Video pods are a model in which explanation of complex biologic pathways may be conveyed to patients. Various features expand the explanation of healthcare issues and allow physicians and researchers to model their explanations with video pods.

Figure 15:
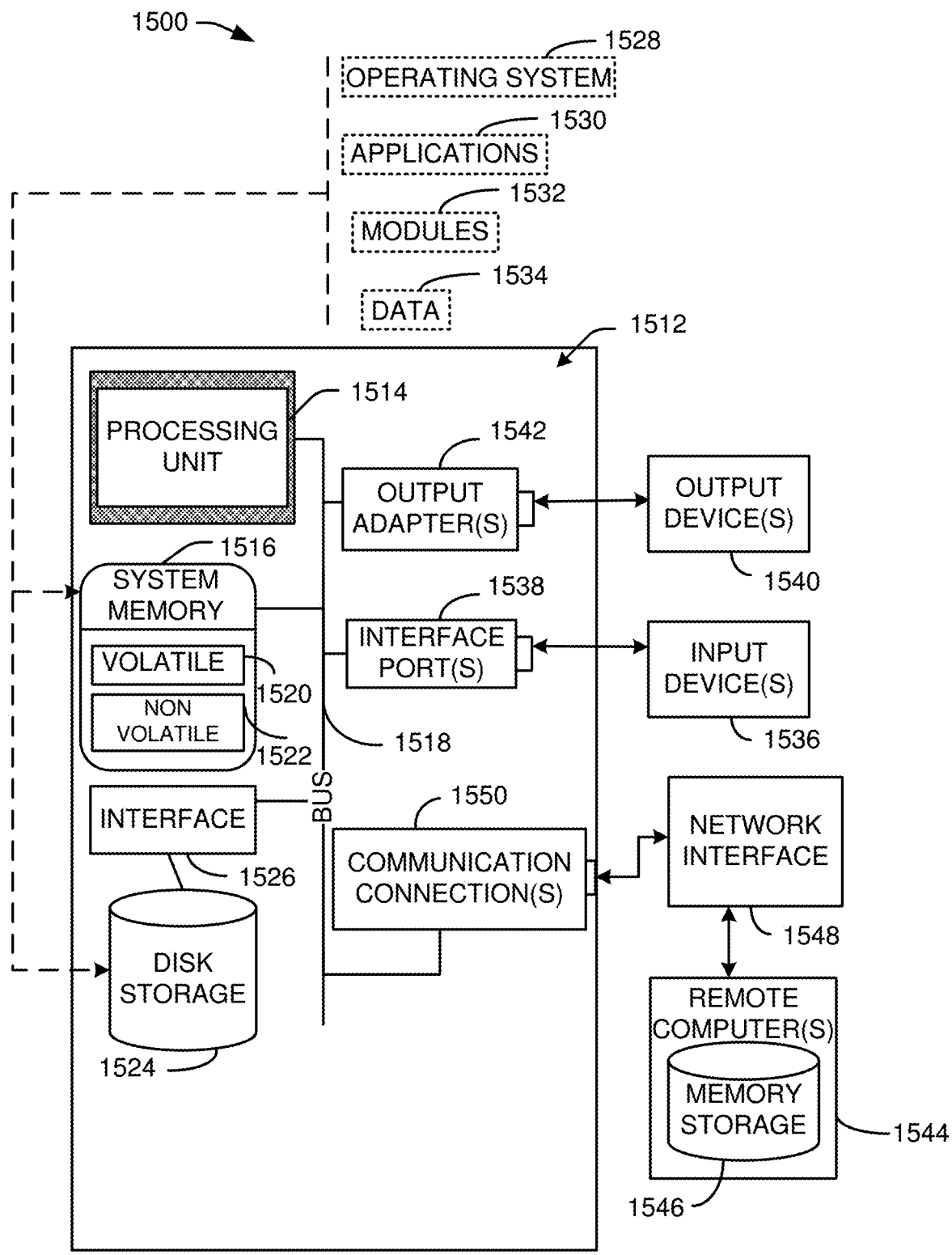
FIG. 15 illustrates a block diagram of an example, non-limiting operating environment in which one or more embodiments described herein can be facilitated.

In order to provide a context for the various aspects of the disclosed subject matter, FIG. 15 as well as the following discussion are intended to provide a general description of a suitable environment in which the various aspects of the disclosed subject matter can be implemented. FIG. 15 illustrates a block diagram of an example, non-limiting operating environment in which one or more embodiments described herein can be facilitated. Repetitive description of like elements employed in other embodiments described herein is omitted for sake of brevity.

With reference to FIG. 15, a suitable operating environment 1500 for implementing various aspects of this disclosure can also include a computer 1512. The computer 1512 can also include a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514. The system bus 1518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1594), and Small Computer Systems Interface (SCSI).

The system memory 1516 can also include volatile memory 1520 and nonvolatile memory 1522. The basic input/output system (BIOS), containing the basic routines to transfer information between elements within the computer 1512, such as during start-up, is stored in nonvolatile memory 1522. Computer 1512 can also include removable/non-removable, volatile/non-volatile computer storage media. FIG. 15 illustrates, for example, a disk storage 1524. Disk storage 1524 can also include, but is not limited to, devices like a magnetic disk drive, floppy disk drive, tape drive, Jaz drive, Zip drive, LS-100 drive, flash memory card, or memory stick. The disk storage 1524 also can include storage media separately or in combination with other storage media. To facilitate connection of the disk storage 1524 to the system bus 1518, a removable or non-removable interface is typically used, such as interface 1526. FIG. 15 also depicts software that acts as an intermediary between users and the basic computer resources described in the suitable operating environment 1500. Such software can also include, for example, an operating system 1528. Operating system 1528, which can be stored on disk storage 1524, acts to control and allocate resources of the computer 1512.

System applications 1530 take advantage of the management of resources by operating system 1528 through program modules 1532 and program data 1534, e.g., stored either in system memory 1516 or on disk storage 1524. It is to be appreciated that this disclosure can be implemented with various operating systems or combinations of operating systems. A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port can be used to provide input to computer 1512, and to output information from computer 1512 to an output device 1540. Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a computer, a server, a router, a network PC, a workstation, a microprocessor based appliance, a peer device or other common network node and the like, and typically can also include many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1550 refers to the hardware/software employed to connect the network interface 1548 to the system bus 1518. While communication connection 1550 is shown for illustrative clarity inside computer 1512, it can also be external to computer 1512. The hardware/software for connection to the network interface 1548 can also include, for exemplary purposes only, internal and external technologies such as, modems including regular telephone grade modems, cable modems and DSL modems, ISDN adapters, and Ethernet cards.

The present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can Include Both Volatile and Nonvolatile Memory. By Way of Illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a processor; and
a memory that stores executable instructions that, when executed by the processor, facilitate performance of operations, the operations comprising:
visually representing two-dimensional content in a three-dimensional augmented reality environment, comprising
obtaining object-related recognizer data for a three-dimensional surface from a registration service,
receiving surface rendering data based on the recognizer data, and outputting to one or more surfaces of a three-dimensional closed surface augmented reality object using the surface rendering data, wherein at least some of the operations are performed on a computer program comprising an augmented reality browser configured to render the three-dimensional closed surface augmented reality object,
wherein the surface rendering data computer comprises two-dimensional display data, and wherein the outputting to the one or more surfaces of the three-dimensional closed surface augmented reality object comprises projecting the two-dimensional display data to an augmented reality surface on a face of a rendered representation of the three-dimensional closed surface augmented reality object, and
wherein the two-dimensional display data comprises an advertisement and the one or more faces of the three-dimensional closed surface is sold or leased for an amount of time.

2. The system of claim 1, wherein the three-dimensional closed surface augmented reality object is augmented to a physical location.

3. The system of claim 1, where the three-dimensional closed surface augmented reality object comprises a geometric polyhedron.

4. The system of claim 1, further comprising a three-dimensional closed augmented reality surface, wherein one or more faces of the three-dimensional closed surface are auctioned.

5. The system of claim 1, wherein the three-dimensional closed surface augmented reality object is a first augmented reality object, and wherein the operations further comprise extending the face by attaching a second augmented reality object to a surface voxel of the first three-dimensional closed surface augmented reality object.

6. The system of claim 5, wherein the operations further comprise attaching a third augmented reality object to a surface voxel of the second augmented reality object.

7. The system of claim 5, wherein the operations further comprise using transition effects to zoom in and out between the first augmented reality object to the second augmented reality object.

8. The system of claim 1, wherein the operations further comprise unrolling a rendered representation of the three-dimensional closed surface augmented reality object into a two-dimensional representation of the three-dimensional closed surface augmented reality object.

9. The system of claim 1, wherein the three-dimensional closed surface augmented reality object is a first augmented reality object, and wherein the operations further comprise rendering the two-dimensional representation of the three-dimensional closed surface augmented reality object on a surface of a second augmented reality object.

10. The system of claim 9, wherein the operations further comprise rolling the two-dimensional representation back to the three-dimensional rendered representation from the surface of the second augmented reality object and detaching the three-dimensional rendered representation from the second augmented reality object.

11. A system comprising:
a processor; and
a memory that stores executable instructions that, when executed by the processor, facilitate performance of operations, the operations comprising:
   visually representing two-dimensional content in a three-dimensional augmented reality environment, comprising
      obtaining object-related recognizer data for a three-dimensional surface from a registration service,
      receiving surface rendering data based on the recognizer data, and outputting to one or more surfaces of a three-dimensional closed surface augmented reality object using the surface rendering data, wherein at least some of the operations are performed on a computer program comprising an augmented reality browser configured to render the three-dimensional closed surface augmented reality object,
   wherein the surface rendering data computer comprises two-dimensional display data, and wherein the outputting to the one or more surfaces of the three-dimensional closed surface augmented reality object comprises projecting the two-dimensional display data to an augmented reality surface on a face of a rendered representation of the three-dimensional closed surface augmented reality object,
   wherein the two-dimensional display data comprises an advertisement and the one or more faces of the three-dimensional closed surface are auctioned.

12. The system of claim 11, further comprising a three-dimensional closed surface, wherein one or more faces of the three-dimensional closed surface is sold or leased for an amount of time.

13. The system of claim 11, wherein the three-dimensional closed surface augmented reality object is a first augmented reality object, and wherein the operations further comprise extending the face by attaching a second augmented reality object to a surface voxel of the first three-dimensional closed surface augmented reality object.

14. The system of claim 13, wherein the operations further comprise attaching a third augmented reality object to a surface voxel of the second augmented reality object.

15. The system of claim 13, wherein the operations further comprise using transition effects to zoom in and out between the first augmented reality object to the second augmented reality object.

16. The system of claim 11, wherein the operations further comprise unrolling a rendered representation of the three-dimensional closed surface augmented reality object into a two-dimensional representation of the three-dimensional closed surface augmented reality object.

17. The system of claim 11 wherein the three-dimensional closed surface augmented reality object is a first augmented reality object, and wherein the operations further comprise rendering the two-dimensional representation of the three-dimensional closed surface augmented reality object on a surface of a second augmented reality object.

18. The system of claim 17, wherein the operations further comprise, rolling the two-dimensional representation back to the three-dimensional rendered representation from the surface of the second augmented reality object and detaching the three-dimensional rendered representation from the second augmented reality object.

19. A method, comprising:
visually representing, on a system comprising a processor, two-dimensional content in a three-dimensional augmented reality environment, the visually representing comprising:
   obtaining object-related recognizer data for a three-dimensional surface from a registration service,
   receiving surface rendering data based on the recognizer data, and outputting to one or more surfaces of a three-dimensional closed surface augmented reality object using the surface rendering data, wherein at least some of the operations are performed on a computer program comprising an augmented reality browser configured to render the three-dimensional closed surface augmented reality object,
   wherein the surface rendering data computer comprises two-dimensional display data, and wherein the outputting to the one or more surfaces of the three-dimensional closed surface augmented reality object comprises projecting the two-dimensional display data to an augmented reality surface on a face of a rendered representation of the three-dimensional closed surface augmented reality object, and
   wherein the two-dimensional display data comprises an advertisement and the one or more faces of the three-dimensional closed surface is sold or leased for an amount of time.

20. The method of claim 19, further comprising unrolling a rendered representation of the three-dimensional closed surface augmented reality object into a two-dimensional representation of the three-dimensional closed surface augmented reality object.

* * * * *